Feb. 15, 1927.

C. A. SNIDER 1,617,870

CUSHION TIRE

Original Filed Aug. 29, 1922

Charles A. Snider, INVENTOR.

BY Geo. P. Kimmel, ATTORNEY.

Patented Feb. 15, 1927.

1,617,870

UNITED STATES PATENT OFFICE.

CHARLES ALBERT SNIDER, OF ATLANTA, GEORGIA.

CUSHION TIRE.

Application filed August 29, 1922, Serial No. 585,112. Renewed January 16, 1926.

This invention has reference to improvements in cushion tires and its object is to provide a tire of this type which shall closely simulate the action and elasticity of a pneumatic tire with the freedom from liability of puncture inherent in cushion tires.

Pneumatic tires are noted for their extreme elasticity, but are disadvantageous in their liability of puncture and the necessity of repairs to restore the function of the pneumatic tire in the event of a puncture permitting the escape of the stored air in the pneumatic tire.

In the case of pneumatic tire, it is a source of considerable annoyance and work to find and repair the puncture and to subsequently restore the air pressure within the tire. This is avoided by providing a relatively large number of open air cushions within the tire so that the air having no opportunity to escape from the pockets holding it, maintains its elastic condition indefinitely and repairs are therefore practically unnecessary.

By providing the air pockets or cushions with open ends, the tire becomes highly resilient and may closely simulate the liveliness and elasticity of pneumatic tire.

The invention will be best understood from a consideration of the following detailed description taken in connection with the accompanying drawing forming part of this specification, with the understanding that the invention is not confined to any strict conformity with the showing of the drawings, but may be changed and modified so long as such changes and modifications mark no material departure from the salient features of the invention as expressed in the appended claim.

In the drawings:—

Figure 1:
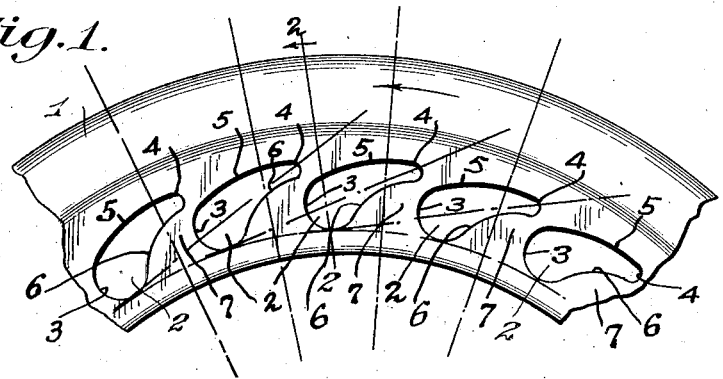
Figure 1 is a side elevation of a portion of a cushion tire constructed in accordance with the invention.
Figure 2:
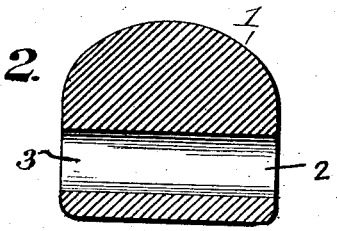
Fig. 2 is a cross section on line 2—2 of Fig. 1.

Referring to the drawings, there is shown a cushion tire 1, which may be made of live rubber or any other suitable material. The body portion of the tire 1, between its outer and inner circumference, but closer to the inner circumference, is formed with a circular row of spaced uniform substantially pear-shaped passages or openings 2, extending transversely therethrough. The passages 2 are tangentially disposed with respect to a circumference concentric with, in close proximity to and radially outward of the inner circumference of the tire and each passage includes an enlarged portion 3 and a contracted outer portion 4. The said portions 3 and 4 are connected together by arcuate portions 5 and 6. The portion 6 terminates in the portion 4 and forms one side, and the portion 3 forms the other side, of a web of a circular row of uniform integral web portions 7, which decrease in width in an outward direction and extend diagonally opposite to the forward direction of rotation. Each web has its outer terminus offset with respect to the radial center thereof, as shown in Fig. 1, whereby the elasticity of the web becomes progressively greater in an outward direction diagonally opposite to the forward direction of rotation.

What is claimed is:—

A tire comprising a resilient body portion in the form of an integral annulus provided adjacent the inner side thereof with a circular row of spaced uniform substantially pear-shaped transversely extending passages, each having its lengthwise center tangentially disposed with respect to a circumference concentric with, in close proximity to, and radially outward of the inner circumference of said body portion, and with the contracted portion of one passage arranged outwardly of and in close relation to the larger portion of an adjacent passage, said passages forming adjacent the inner side of said body portion a circular row of uniform integral webs decreasing in width in an outward direction diagonally opposite to the forward direction of rotation, each web having its outer terminus offset with respect to its radial center to increase the resiliency of the body portion.

In testimony whereof, I affix my signature hereto.

CHARLES ALBERT SNIDER.